P. H. F. SPIES.
MACHINE FOR BAKING ICE CREAM CONES, &c.
APPLICATION FILED SEPT. 7, 1917.
1,341,084.
Patented May 25, 1920.
4 SHEETS—SHEET 1.
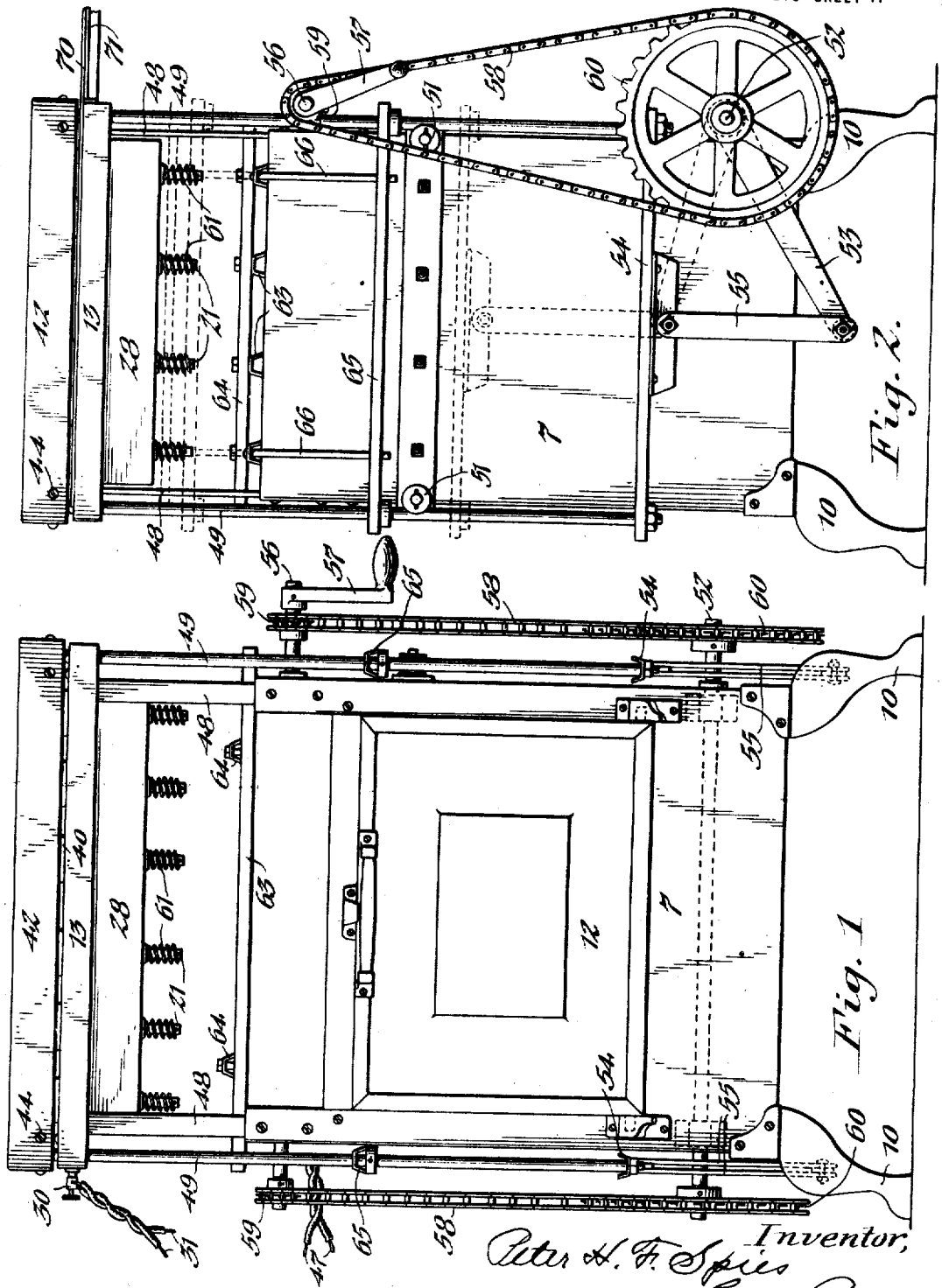

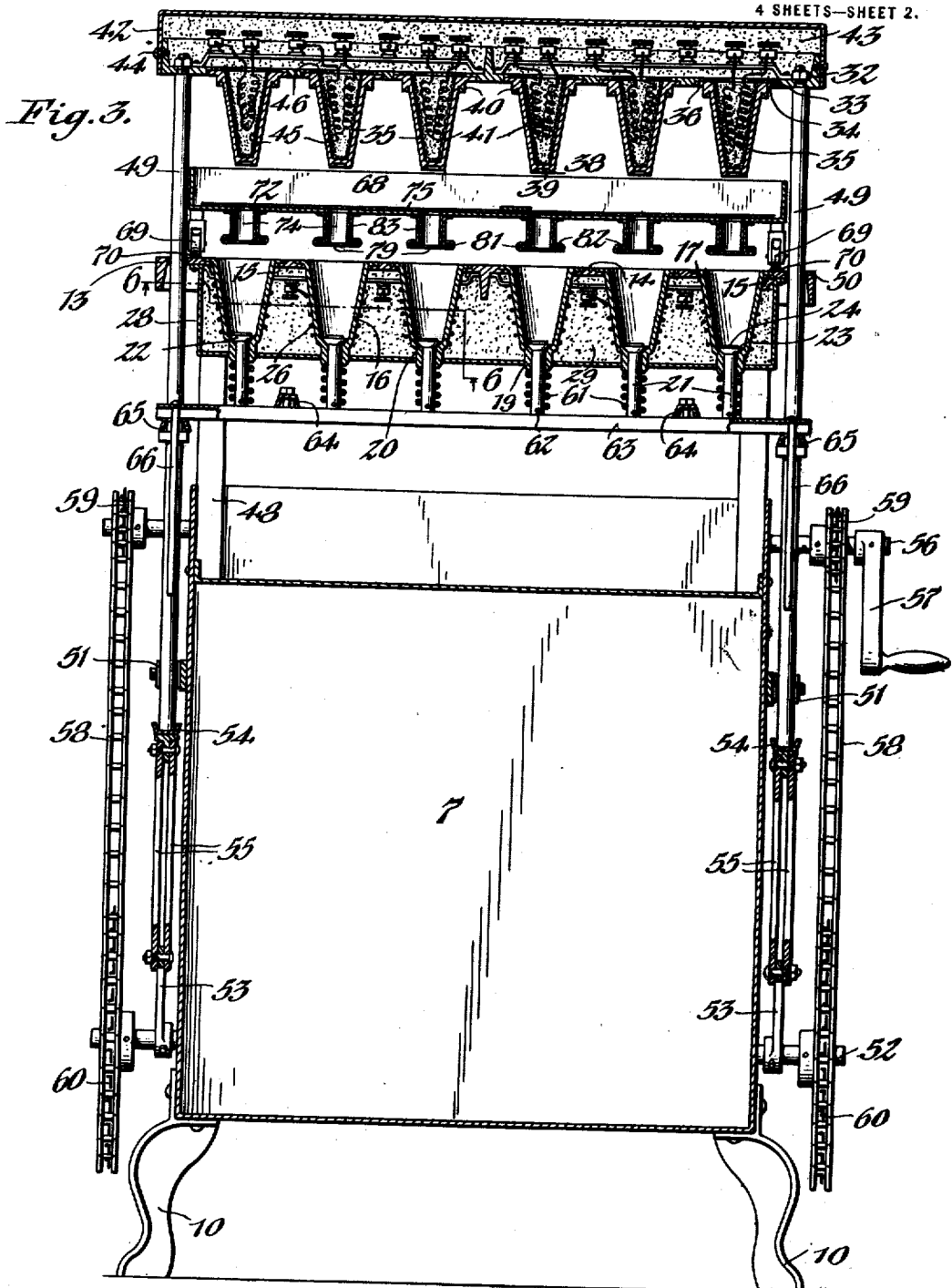

P. H. F. SPIES.
MACHINE FOR BAKING ICE CREAM CONES, &c.
APPLICATION FILED SEPT. 7, 1917.
1,341,084.
Patented May 25, 1920.
4 SHEETS—SHEET 3.
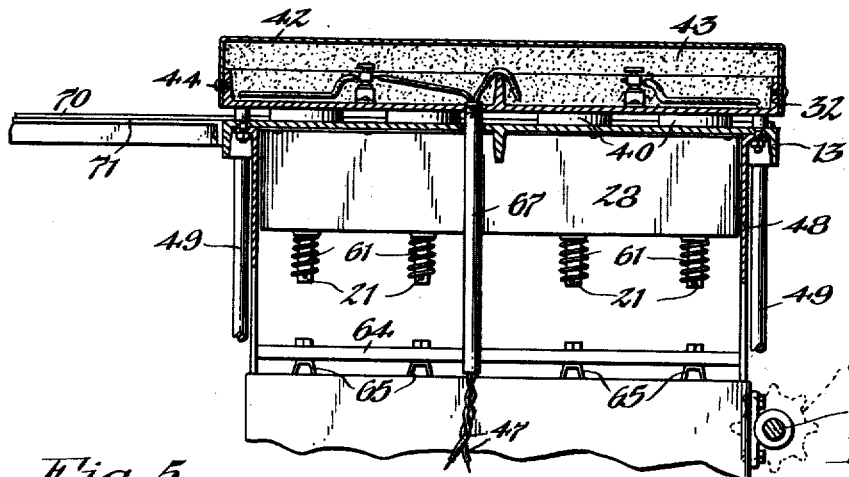
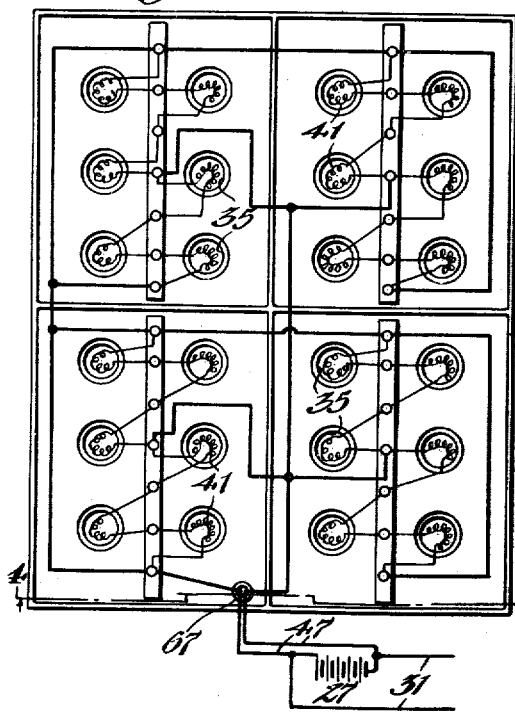
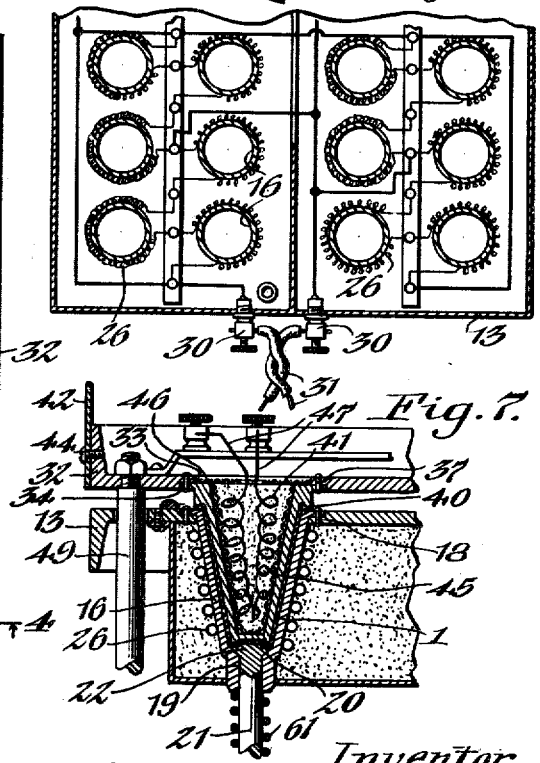
Inventor,
Peter H. F. Spies
by Geyer & Pohl
Attorneys.

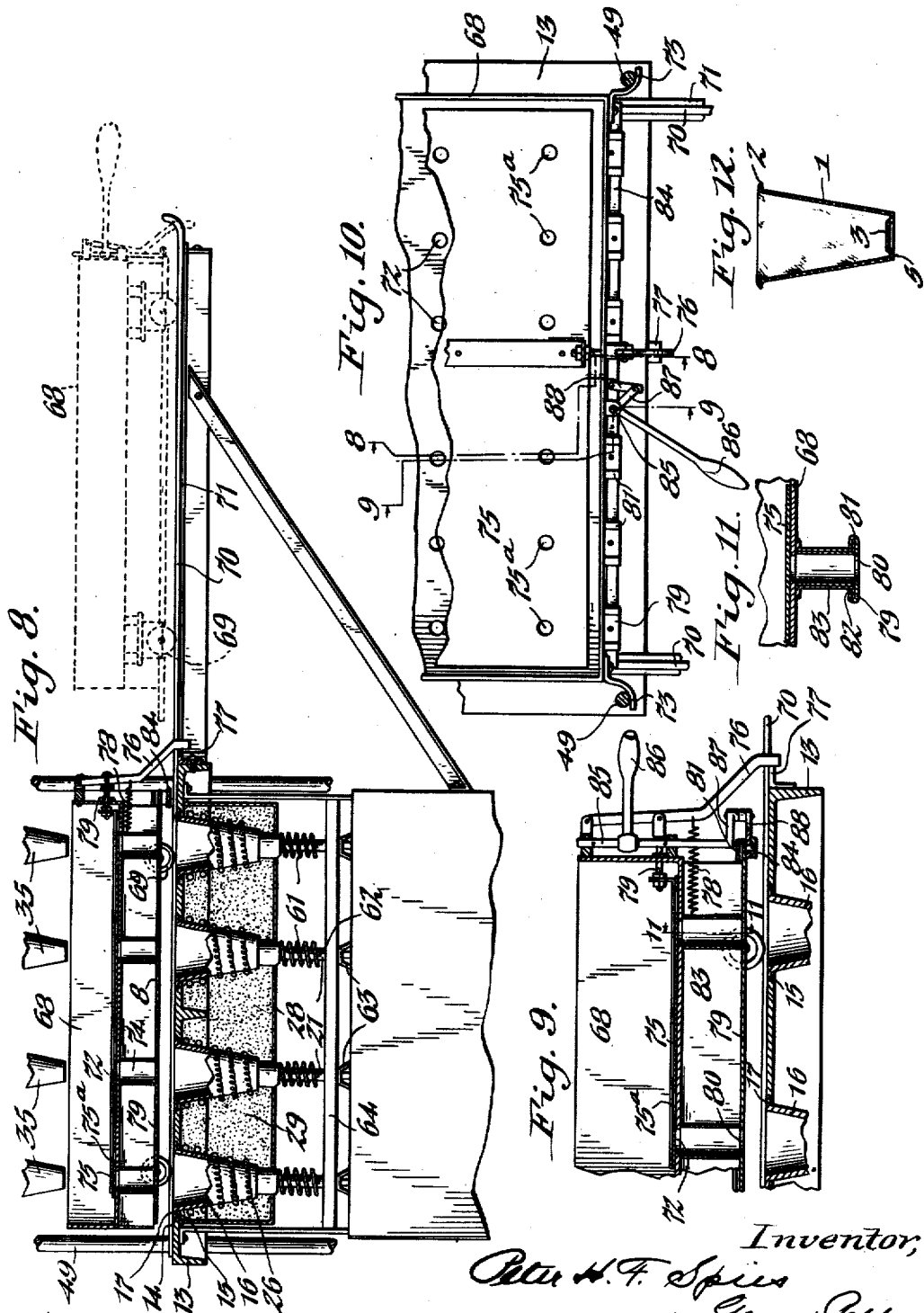

UNITED STATES PATENT OFFICE.

PETER H. F. SPIES, OF BUFFALO, NEW YORK, ASSIGNOR TO THE SEBCO COMPANY, INCORPORATED, OF BUFFALO, NEW YORK, A CORPORATION OF NEW YORK.

MACHINE FOR BAKING ICE-CREAM CONES, &c.

1,341,084.  Specification of Letters Patent.  Patented May 25, 1920.

Application filed September 7, 1917. Serial No. 190,111.

*To all whom it may concern:*

Be it known that I, PETER H. F. SPIES, a citizen of the United States, residing at Buffalo, in the county of Erie and State of New York, have invented new and useful Improvements in Machines for Baking Ice-Cream Cones, &c., of which the following is a specification.

This invention relates to a baking machine which is more particularly designed for baking cup-shaped receptacles such as are now commonly employed for dispensing ice cream and generally known as ice cream "cones."

It is the object of this invention to produce a machine for this purpose which is comparatively simple and compact in construction, which permits of baking cones economically and expeditiously and which can be operated with comparatively little power and at an expenditure of a minimum amount of heat.

In the accompanying drawings:

Figure 1 is a front elevation of the baking machine embodying my invention, showing the position of the parts when the baking of a batch of goods is being effected. Fig. 2 is a side elevation of the same. Fig. 3 is a vertical longitudinal section of the machine, on an enlarged scale, showing the position of the parts when the baking dies are separated and the dough supplying device is in position to deliver batches of dough to the dies. Fig. 4 is a fragmentary vertical transverse section taken on the correspondingly-numbered line in Fig. 5. Fig. 5 is a top plan view of the upper die head of the machine with the cover or casing removed, showing the electrical connections of the heating elements for the upper or male dies. Fig. 6 is a fragmentary horizontal section, on a reduced scale, taken on line 6—6, Fig. 3, and showing the electric wiring of the heating elements for the lower or female dies. Fig. 7 is a vertical section, on an enlarged scale, showing a pair of male and female dies in the relative position which they occupy when baking an ice cream cone or cup. Figs. 8 and 9 are fragmentary vertical transverse sections taken on lines 8—8 and 9—9, Fig. 10, respectively. Fig. 10 is a fragmentary top plan view, partly in section, of the dough supplying mechanism. Fig. 11 is a fragmentary vertical section, on an enlarged scale, taken in line 11—11, Fig. 9. Fig. 12 is a vertical section of an ice cream cone or cup which is baked on my improved baking machine.

Similar characters of reference indicate corresponding parts throughout the several views.

Although the shape of the ice cream cone or cup which is produced by this machine may be varied, it is preferable to bake the same of the form shown in Fig. 12, and as there shown the same comprises an upwardly-flaring conical body 1, an annular rim or flange 2 arranged externally at the upper end of the conical body and a bottom having a flat central part 3 extending across the lower end of the body and connected therewith by an annular bead 5, the concave side of which faces upwardly. An ice cream cone or holder thus constructed, is capable of resting with its lower end firmly on a table or other support together with the ice cream deposited therein in the manner in which an ordinary drinking glass or cup rests on a table or support and therefore avoids the necessity of constantly holding the ice cream cone in the hand, as is necessary in the case of cones as heretofore made with a pointed lower end. The present cones are therefore more convenient and render the eating of ice cream in this manner more enjoyable. It is to be understood, however, that this machine is capable of making cones of this character which may be of any other suitable construction or form.

The main frame of this machine may be of any suitable construction to support the various working parts, but, as shown in the drawings, this frame is preferably constructed in the form of a base 7 which is hollow so as to form a storage chamber for various cooking utensils. This base is provided on its underside with legs 10 whereby the same may be supported on the floor and on its front side with a door 12 whereby articles may be introduced into and removed from the storage chamber.

Above the base of the machine, are arranged a lower baking unit and an upper baking unit which are adapted to coöperate with each other for forming and baking cup or cone-shaped baked goods suitable for serving ice cream, these units being preferably so constructed that a plurality of such cones may be baked simultaneously, The lower baking unit preferably comprises a horizontal supporting head 13 constructed of metal and provided with a plurality of openings 14 which are arranged in a plurality of transverse parallel rows each of these openings being provided with an annular rabbet or seat 15 on its upper side. On this lower supporting head is arranged a plurality of lower baking dies each of which comprises a downwardly-tapering conical body 16 which is arranged with its upper part within one of the openings of the lower head and provided at its upper end with an annular external flange 17 which engages with the rabbet of the respective opening and is secured therein by means of rivets 18, as shown in Fig. 7, or by any other suitable means. At its lower end this lower conical die body is provided with a vertical guide-opening 19 and a conical seat 20 which narrows downwardly. Sliding vertically in the guide opening 19 of the body is the upright stem 21 of an ejector, the upper end of which is provided with a disk the underside 22 of which is of downwardly-tapering form and adapted to rest on the correspondingly-shaped seat 20 of the lower end of the die-body, while its upper side is provided with a substantially horizontal marginal portion 23 and an upwardly-projecting crown 24 on the central part of this disk. The upper surface of this disk is adapted to form the underside of the baked ice cream cone, while the bore of the conical body 16 forms the outer side thereof and the upper edge of the conical body forms the underside of the flange 2 on the upper end of the ice cream cone.

Each of these lower conical bodies and the parts associated therewith form the female member of a pair of coöperating dies between which one ice cream cone at a time is formed and baked. This female die may be heated in any suitable manner, but this is preferably effected electrically by winding an electric heating element around the outer side of the female die which element may have the form of a spiral or coil 26, as shown in Fig. 7, and connected with a source of electric supply 27 in any desired manner. For the purpose of conserving the heat generated by these electric elements of the female dies, a casing or cover 28 is secured to the underside of the lower die head so as to inclose the lower dies and form a chamber with the upper die head, this chamber being filled with powder or loose asbestos 29, or any other suitable electric and heat insulating material, it being understood that the heating elements are covered with suitable insulation such as asbestos for the purpose of preventing short-circuiting by contact with the metal of which the female dies are constructed. The several heating elements of the lower baking unit may be electrically connected with each other and with the source of electric current in any suitable manner, for instance, partly in parallel and partly in series, as shown in Fig. 6, and the terminals of the entire group of lower heating elements being connected by a binding post 30 with two supply wires 31 leading to the electric current source or generator 27.

The upper baking unit comprises an upper horizontal head 32 of metal provided with a plurality of openings 33 each of which is vertically in line with the die openings of the lower supporting head and has an annular rabbet or seat 34 on its underside. Below each of the upper die openings in the upper die head is arranged a male forming and baking die which coöperates with the female die below the same, this male die comprising a hollow downwardly-tapering conical body 35 which is provided at its upper end with an annular flange 36 engaging with the corresponding rabbet 34 and secured to the respective supporting head by means of rivets 37, as shown, or otherwise. The lower end or bottom of each male die is arranged substantially horizontal and provided on the marginal part of its underside with an annular downwardly-projecting bead 38 forming a downwardly-opening cavity 39 on the central part of the underside of the male die.

Around its upper end the male die is provided with an external downwardly-projecting flange 40 preferably provided with a lower cutting edge which is adapted to engage with the upper end of the companion lower female die. The exterior surface of the conical body, bottom and upper external flange and the upper or male die form the internal and upper surfaces of the cone or cup which is to be formed and baked by coöperation of this male die with the companion female die. This male die is preferably constructed of metal and the heating of this die may be effected by various means but preferably by an electric heating element which is arranged in the form of a coil 41 within the male die and provided with a cover of insulating material, such as asbestos. In order to prevent the exposed parts of the upper heating element from coming in contact with the metal of the upper or male die, the interior of the latter is provided with a lining 45 of sheet asbestos, and the upper end of the same is provided with a retaining disk 46 of sheet asbestos having a central opening through which the lead lines 47 of the respective heating element pass. The several upper heating elements may be electrically connected with the source of electric current supply 27 in any suitable manner, but as shown in Fig. 5, they are connected partly in series and partly in parallel with the lines 47 leading to opposite holes for this electric generator. A cover or casing 42 extends over the top of the upper head and forms a chamber therewith, this chamber and the space within each male die being preferably packed or filled with loose or powdered asbestos 43, or any other electric and heat insulating material which will conserve the heat given off by the electric elements. The upper casing may be connected with the upper head in any suitable manner but preferably by means of screws 44, as shown in Figs. 1, 2, 3 and 4, so as to permit of detaching this upper casing whenever this becomes necessary or desirable for inspection or repairs.

The set of lower female dies and the set of upper male dies may be moved vertically one toward and from the other for the purpose of separating or opening these dies to permit of removing the baked cones and replacing the same with batches of fresh dough, and then closing these dies so that each male die enters one of the female dies and forms the dough therein into the shape of a cone or cup, preparatory to baking same. In the preferred construction of this machine, these upper and lower dies are so mounted that the lower dies and associated parts are stationary while the upper dies and associated parts move vertically toward and from the lower dies. For this purpose the head 13 of the lower set of dies is supported at its corners by means of upright standards 48 on the top of the main frame or base and the head of the upper heating or baking unit is guided in its vertical movement toward and from the lower unit by a plurality of upright guide rods 49 which are preferably secured at their upper ends to the corners of the upper supporting head and guided intermediate of their upper and lower ends in openings 50 arranged at the corners of the lower supporting head and by means of guide rollers 51 mounted on the outer side of the base or frame and engaging with the guide rods 49, as best shown in Figs. 1, 2, 3 and 7.

The raising and lowering of the upper heating or baking unit may be effected by means which vary as to details of construction, but those which are shown in the drawings are preferred inasmuch as they have been found satisfactory in practice. This lifting mechanism, as best shown in Figs. 1, 2 and 3, comprises a horizontal rock shaft 52 which is journaled lengthwise in suitable bearings on the rear lower part of the main frame and provided at opposite ends of the base with two forwardly-projecting rock arms 53, two horizontal connecting bars 54 arranged transversely at opposite ends of the main frame and each connected at its front and rear ends with the lower ends of a pair of the guide rods 49, two links 55 each connecting the central part of one of the connecting bars 54 with the front end of one of the rock arms 53, a horizontal operating shaft 56 journaled lengthwise in suitable bearings on the upper rear part of the main frame and provided at one end with a crank or handle 57 for turning the same, and two operating chains or belts 58 arranged at opposite ends of the main frame and each passing with its upper turn around a small sprocket wheel 59 at one end of the operating shaft while its lower turn passes around a large sprocket wheel 60 secured to the corresponding end of the lower rock shaft. Upon turning the crank in one direction, the upper heating unit will be raised easily, slowly and positively, and upon turning this crank in the opposite direction this heating unit will be in like manner lowered.

During the last portion of the upward movement of the upper heating or baking unit and after the male dies have been withdrawn from the female dies, the several ejectors are raised a sufficient extent to cause the disks thereof to lift the baked cones or cups from the female dies to permit of completely removing these baked goods either by hand or by any suitable device provided for that purpose. After the baked cones or cups have been thus removed, the upper heating unit is lowered slightly and the several ejectors are lowered so that they again bear against the bottoms of the several female dies, preparatory to introducing a batch of fresh dough. In order to thus operate the several ejectors, each one of them is yieldingly held in its lowermost position by means of a spring 61 which surrounds the stem thereof and bears at its upper end against the lower end of the companion female die while its lower end bears against a pin or shoulder 62 arranged on the lower part of the respective ejector stem. Arranged lengthwise underneath each longitudinal row of ejector stems is a horizontal shifting or lifting bar 63, the opposite ends of which project laterally beyond opposite sides of the main frame. The several lifting bars are connected with each other intermediate of their ends so that they move in unison, by means of two transverse bars 64 secured to the upper sides of the lifting bars, as best shown in Figs. 1, 2 and 3.

65, 65 represent two horizontal tappet bars arranged transversely at opposite ends of the main frame and each connected at its opposite ends with the adjacent pair of upright guide rods 49. Each of these tappet bars is arranged transversely underneath the corresponding ends of the horizontal shifting bars 63 so that during the last part of the upward movement of these guide rods, together with the upper heating unit, these tappet bars will engage with the ends of these lifting bars and raise the same together with the ejectors and the baked cups or cones arranged within the lower or female dies.

After the upper heating unit has again effected the initial part of its downward movement, together with the guide rods 49, then the tappet bars 65 have lowered the horizontal lifting bars 63 sufficiently to permit the ejectors to descend into their lowermost position within the female dies. The lifting bars 63 are retained in their proper position relative to the tappets by means of a plurality of upright retaining rods 66 secured at their upper ends to the front and rear lifting bars 63 and sliding loosely at their lower ends through openings in the tappet bars 65, as best shown in Figs. 2 and 3.

After the ejectors have been again lowered into their operative positions within the female dies, and while the male dies are still withdrawn from the female dies, batches of fresh dough are delivered into the several female dies and then the male dies are lowered so that they enter the female dies and cause the dough therein to be spread out into the form of conical cups or cones corresponding to the faces of the respective dies. During the last portion of this downward movement of each male die, its flange 40 engages its lower cutting edge with the upper marginal part of the companion female die and severs the surplus dough from the upper flange of the cup or cone which is being baked, thereby leaving a clean cut circular edge on the finished product. After the male dies have thus fully entered the female dies the same are held in this closed position until the dough has been thoroughly baked by the heat of the electric coils arranged around the female dies and within the male dies. After this operation has been completed, which usually takes about two to three minutes, the male dies are again raised clear of the female dies and the ejectors are lifted so as to raise the baked cups or cones out of the female dies within convenient reach of the operator, so that they may be completely removed from the machine.

For the purpose of protecting the feed wires 47, 47, leading to the upper heater elements and preventing the same from interfering with the lower parts of the machine, these wires are preferably carried through an upright protecting tube 67 which is secured at its upper end in an opening in the head of the upper heating unit while its lower part slides through an opening in the lower head 13, as best shown in Fig. 4.

In order to obtain the maximum output of the machine, means are provided whereby measured batches or quantities of dough may be successively introduced into the several female dies with expedition, convenience and facility. The preferred means for this purpose which are shown in the drawings are constructed as follows:

68 represents a dough supply pan or receptacle which is movable horizontally and transversely into and out of the space between the upper and lower dies when the same are separated and preferably toward and from the rear of the machine. For this purpose, this pan is movably supported by means of wheels or rollers 69 mounted on the underside of the pan adjacent to its opposite transverse edges and running on tracks 70, 70 which are arranged transversely on the upper side of the lower heating head and on brackets 71, 71, projecting rearwardly from the rear side of the main frame. On its underside this dough supply pan is provided with a plurality of outlet openings 72 which correspond in number and location to the disposition of the several pairs of upper and lower forming and baking dies, so that when this pan is moved into its proper position between the upper and lower heating units, each of the outlet openings in the bottom of the pan will be vertically in line with the axes of a pair of corresponding upper and lower dies.

In order to permit of quickly and reliably centering the outlet openings of the dough pan relative to the baking dies, means are provided for arresting forward movement of the pan in its proper working position, these means consisting preferably of two stop lugs 73 projecting laterally from opposite sides of its rear part in position to engage the rear guide rods 49 of the upper heating unit, as shown in Fig. 10.

Projecting downwardly from the underside or bottom of the pan in line with each of the outlet openings thereof, is a measuring spout or tube 74, the dimensions of which are such that the same will hold when fully filled a quantity of fresh, liquid or soft dough sufficient for making one ice cream cone or cup.

A valve mechanism is provided whereby the upper and lower ends of the measuring tubes may be opened and closed for delivering measured quantities of the dough to the several female baking dies. In its preferred construction, this valve mechanism which is best shown in Figs. 3, 8, 9, 10 and 11, is constructed as follows:

75 represents a multiple valve which is preferably constructed of a sheet or plate of pliable rubber or similar material, which rests on the bottom of the pan and is provided with a plurality of ports or openings 75$^a$ which are so disposed that upon moving this valve plate forwardly over the bottom of the pan, the openings of the same will be arranged over the upper or inlet ends of the measuring tubes and connect the latter with the interior of the pan so that the dough can flow from the pan into the measuring tubes while upon moving this valve plate rearwardly, sufficiently to bring its solid parts over the several measuring tubes, then communication will be cut off between these tubes and the interior of the pan and dough will no longer flow from the latter into these tubes. In order to expedite the operation of the machine, the opening and closing of the valve plate 75 is preferably effected automatically by means of a shifting lever 76 which is pivoted at its upper end to the rear side of the dough pan and adapted to engage at its lower end with a tappet or stop 77 on the rear side of the heating head, a spring 78 connecting the lower part of this shifting lever with an adjacent measuring tube or other part moving with the dough pan, and a connecting valve plate 79 extending through a packed opening in the rear wall of the dough pan and connected at its front and rear ends respectively with the upper valve plate and the shifting lever below the pivot of the latter, as best shown in Figs. 8 and 10. While the dough pan is moved rearwardly on its tracks into its inoperative position, as shown by dotted lines in Fig. 8, the lever 76 is pulled forwardly by the spring 78 together with the upper valve plate, thereby causing the upper valve 75 to open the upper or inlet ends of the measuring tubes. During the last part of the forward movement of the pan the lower end of the shifting lever 76 engages with the tappet 77 and causes this lever to be swung rearwardly relatively to the dough pan a sufficient extent to move the upper valve 75 rearwardly, as shown by full lines in Figs. 8, 9 and 11, and thereby cut off the further flow of soft dough from the pan and the measuring tubes. During the first part of the subsequent rearward movement of the dough pan the shifting lever is again carried away from the tappet 77 and permitted to be swung forwardly by the spring 78, so as to bring the openings of the upper valve 75 into register with the measuring tubes and again permit dough to flow from the pan into these tubes.

The lower or outlet ends of the measuring tubes are opened and closed by a plurality of valve plates 79 each of which moves horizontally and transversely across the lower ends of a transverse row of measuring tubes and is provided with a plurality of outlet ports or openings 80 each of which in the rearward position of this plate is in line with the lower end of one of the measuring tubes so as to permit any dough therein to flow into the female die below the same, as shown by full lines in Figs. 9 and 11. Upon moving this valve plate forwardly, so that each of its ports is out of register with the companion measuring tube, then the solid parts of this plate close the lower ends of the respective measuring tubes, as shown in Figs. 3 and 8, and thereby prevent any further discharge from the lower ends of these tubes. Each of the lower valve plates is preferably guided in its transverse movements by providing its opposite longitudinal edges with upwardly-turned channels or guide flanges 81 which engage with laterally-projecting guide flanges 82 formed on the lower ends of two upright supporting plates 83 which are arranged on opposite sides of a transverse row of measuring tubes and secured thereto as well as to the underside of the dough pan. By this means these supporting plates operate not only as part of the means for guiding the lower valve plates but also retain the measuring tubes in their proper position and stiffen the structure as a whole. The forward and backward movement of the several lower valve plates 79 is preferably effected simultaneously by connecting the rear ends of the same with a longitudinal operating bar 84, as best shown in Figs. 9 and 10, which bar is preferably shifted by manual means consisting of an upright rock shaft 85 journaled in suitable bearings on the rear side of the dough pan and provided on its lower part with a handle 86 and on its lower end with a crank 87 which is connected by a link 88 with the operating bar 84. Upon turning this rock shaft 85 in one direction by means of its handle 86, the several lower valve plates will be moved rearwardly relatively to the measuring tubes for opening the lower ends of the latter while upon turning the rock shaft in the opposite direction these valve plates will be moved forwardly for closing the lower ends of these tubes.

In the operation of the dough pan, the upper and lower valves 75, 79, is such that the same alternately open the upper and lower ends of the measuring tubes but never open both of these ends at the same time, so that the dough cannot flow without interruption from the pan through the measuring tubes and out of the lower ends of the latter. For this purpose the lower ends of the measuring tubes are closed by the lower valve plates 79 and the upper ends of these tubes are opened by the upper valve plate 75 while the dough pan is moved rearwardly from between the upper and lower baking dies, at which time the dough is free to flow from the pan into the several measuring tubes, so as to completely fill the latter. During the last part of the forward movement of this pan, the upper ends of the measuring tubes are automatically closed by reason of the shifting lever 76 engaging with the tappet 77 and moving the upper valve plate in the proper direction for accomplishing this result. The operator then turns the rock shaft 85 so as to shift the lower valve plates 79 and open the lower ends of the measuring tubes, whereby the contents of the latter flow out of the same into the respective female dies below the same. After the contents of the measuring tubes has been thus discharged, the attendant rocks the shaft 85 in the opposite direction so as to again close the lower ends of the measuring tubes and then draws the dough pan and associated parts rearwardly, whereby the upper valve plate is again automatically shifted into its open position and another batch of dough is permitted to flow into each of the measuring tubes preparatory to beginning the next cycle of operations of the machine.

It will be obvious from the foregoing description that this machine is very simple and compact in construction considering the functions which it is designed to perform, and that the same permits of expeditiously baking cones or cups at low cost and that the operation of the same can be effected easily and without undue labor or discomfort to the operator inasmuch as the raising and lowering of the upper heating unit and the shifting of the dough pan can be accomplished easily and the heat of the electrical baking units is so conserved that the same is directed immediately against the goods which are to be baked and practically none of this heat is permitted to dissipate into the surrounding atmosphere and become wasted.

I claim as my invention.

A baking machine comprising a lower female die having a tubular body, an open upper end and a guide opening in its lower end, a vertically movable ejector comprising a stem sliding in said guide opening and provided at its upper end with a disk which normally extends across the lower end of said body, the upper surface of said disk having a central elevated part and a depressed marginal shoulder, and a male die adapted to move into and out of said female die and provided on its lower end with an annular downwardly projecting bead and an elevated central part which coöperate with the lower end of the female die and the marginal shoulder and elevated part of the disk to produce an annular rim on the lower end of a cup-shaped receptacle which is baked in the machine.

PETER H. F. SPIES.